No. 670,670. Patented Mar. 26, 1901.
W. S. HADAWAY, Jr.
ELECTRIC STOVE.
(Application filed June 30, 1900.)
(No Model.)

Witnesses
Edward Rowland
Frank S. Price

William S. Hadaway Jr. Inventor
By his Attorney
H. Mackay

UNITED STATES PATENT OFFICE.

WILLIAM S. HADAWAY, JR., OF EAST ORANGE, NEW JERSEY.

ELECTRIC STOVE.

SPECIFICATION forming part of Letters Patent No. 670,670, dated March 26, 1901.

Application filed June 30, 1900. Serial No. 22,106. (No model.)

*To all whom it may concern:*

Be it known that I, WILLIAM S. HADAWAY, Jr., a citizen of the United States, residing in East Orange, in the county of Essex and State of New Jersey, have invented a certain new and useful Improvement in Electric Stoves, of which the following is a specification.

The principal object of my present invention is the provision of means whereby all, or very nearly all, of the heating-surface of an electric stove may be made available for heating purposes and whereby the heat units developed may be economized as far as possible.

In electric stoves for heating flat-irons, hatters' pads, and the like it has been found that in practice the central part of the heating-plate produces practically all of the heating effect, while the outer parts act more as mechanical supports than as dispensers of heat. This gives rise to considerable loss of heat through radiation from surfaces not brought into contact with the article to be heated. My present invention is designed to greatly diminish this source of loss and also to provide a gain in economy by establishing a comparatively high-temperature level from which the final higher temperature of the electric stove may be built up.

My invention is illustrated in the accompanying drawings, wherein—

Figure 1:
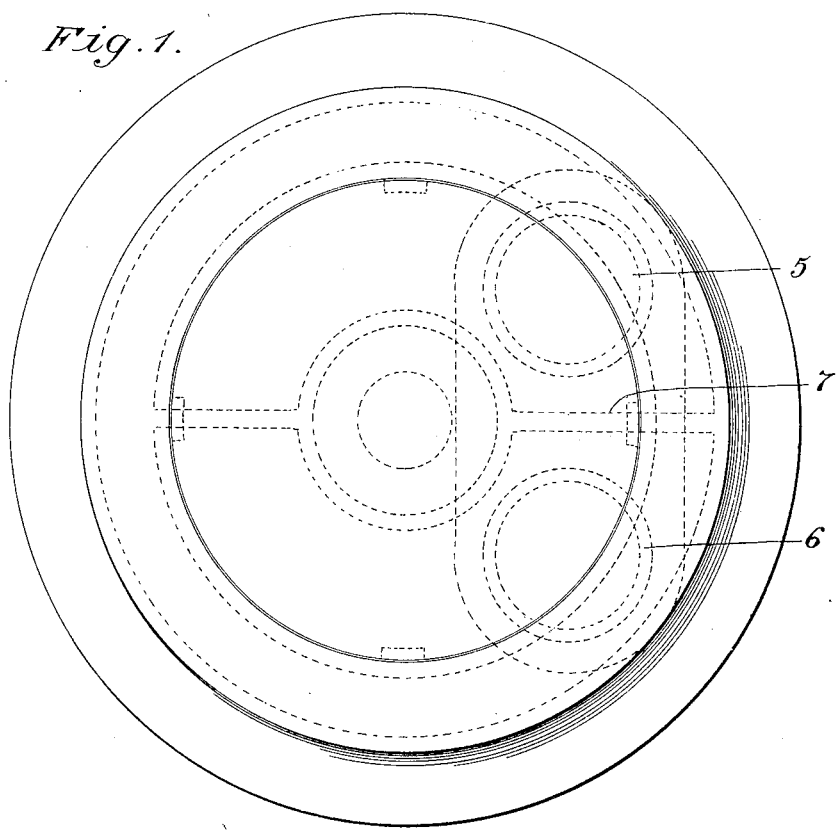
Figure 2:
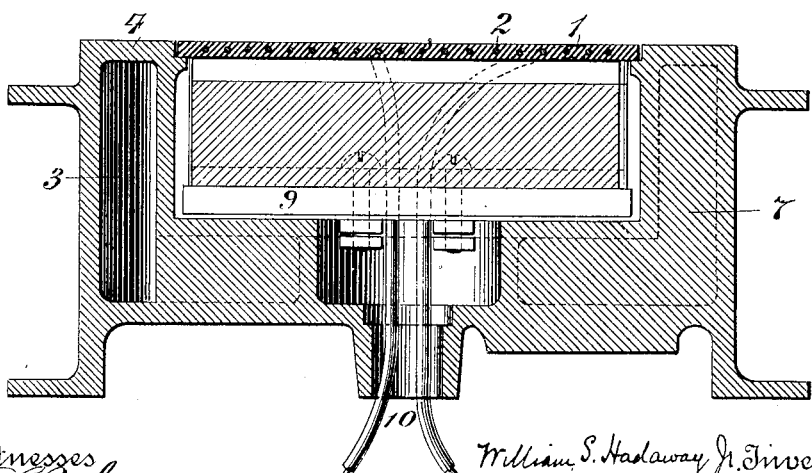

Figure 1 is a plan view of a circular stove built in accordance with my invention, and Fig. 2 is a median vertical section of the same.

In the drawings the electric heater is shown at 1, and this may be of any well-known arrangement, preferably a thin disk containing the resistance-wires 2, as shown.

At 3 is shown an annular steam-space surmounted by an annular plane surface or table 4. The annular table 4 lies in the same plane with the heating-disk 1 and fits closely around it, as shown. Through the annular space 3 I cause steam to circulate from one opening 5 to another opening 6 on opposite sides of the diaphragm 7. This steam acts to heat up the annular table 4 to about 212° Fahrenheit, and this heat is quickly communicated to the electric heater 1. Thus when the electric current is turned on the final high temperature is obtained by building up upon the original heat of the steam in the chamber 3.

The electric heater 1 is preferably supported from the flange 8, and beneath it is placed any desired form of heat-insulator 9. The electric wires are brought up through the bottom opening 10.

It will be seen that the form of heating-stove thus supplied has its outer portion 4 employed as a sort of screen for the high degree of heat of the center portion and at the same time furnishes the mechanical support supplied by the outer edges of other forms of heater. Moreover, a considerable advantage is derived from starting with a low heat potential in a medium (as steam) containing a comparatively large quantity of heat and establishing thereon the small quantity high potential medium.

What I claim is—

1. A heater having two sections with active surfaces in substantially the same plane, one surrounding the other, means for heating the central section by electric current and means for producing a lower degree of heat in the outer section.

2. In an electric stove, an annular body having an annular chamber formed therein and means for supplying said chamber with heated fluid, said body having a flat top, in combination with an electric heater situated within the opening in the annular body and having its upper surface in substantially the plane of the flat top.

3. In a heater, an annular body having an annular chamber formed therein, means for admitting steam to said chamber, an electric heater placed within the upper part of the space surrounded by said annular body and conductors communicating with said electric heater through the lower part of said space.

4. In a heater, an annular body having an annular chamber formed therein, a partition in said chamber, a steam inlet and outlet communicating with said chamber on opposite sides of said partition and an electric heater surrounded by said annular body.

WILLIAM S. HADAWAY, JR.

Witnesses:
OSCAR O. SEYFERT,
HAROLD S. MACKAYE.